United States Patent
Lam

(10) Patent No.: US 9,120,030 B2
(45) Date of Patent: Sep. 1, 2015

(54) BOOK ASSEMBLY WITH SLIDER-ACTIVATED SWITCH

(71) Applicant: Leo Paper Bags Manufacturing (1982) Limited, Kowloon (HK)

(72) Inventor: Cannie Lam, Kowloon (HK)

(73) Assignee: Leo Paper Bags Manufacturing (1982) Limited, Kowloon (HK)

( * ) Notice: Subject to any disclaimer, the term of this patent is extended or adjusted under 35 U.S.C. 154(b) by 0 days.

(21) Appl. No.: 13/665,725

(22) Filed: Oct. 31, 2012

(65) Prior Publication Data

US 2014/0120504 A1    May 1, 2014

(51) Int. Cl.
*G09B 17/00* (2006.01)
*A63H 33/38* (2006.01)
*G09B 5/06* (2006.01)

(52) U.S. Cl.
CPC ............... *A63H 33/38* (2013.01); *G09B 5/062* (2013.01); *G09B 17/00* (2013.01)

(58) Field of Classification Search
CPC ......... A63H 33/38; G09B 17/00; G09B 5/062
USPC ........................... 434/178, 317; 446/147, 149
See application file for complete search history.

(56) References Cited

U.S. PATENT DOCUMENTS

| | | | |
|---|---|---|---|
| 2,477,134 A | | 7/1949 | Mariner |
| 4,438,301 A | * | 3/1984 | Van Zeeland ............... 200/16 C |
| 4,554,419 A | * | 11/1985 | King et al. .................... 200/5 A |
| 4,990,092 A | * | 2/1991 | Cummings .................... 434/317 |
| 6,041,215 A | * | 3/2000 | Maddrell et al. ............... 434/317 |
| 6,210,248 B1 | * | 4/2001 | McAdam ....................... 446/147 |
| 6,796,061 B2 | * | 9/2004 | Gemma, Jr. .................... 40/491 |
| 8,376,408 B2 | * | 2/2013 | Legrand .......................... 281/40 |
| 2003/0129572 A1 | * | 7/2003 | Shuler et al. ................... 434/317 |
| 2007/0124968 A1 | | 6/2007 | Oudekerk et al. |
| 2007/0134638 A1 | * | 6/2007 | Mullen .......................... 434/317 |

FOREIGN PATENT DOCUMENTS

| | | | |
|---|---|---|---|
| EP | 150600 A2 * | 8/1985 | ............. H01H 13/70 |
| GB | 2278979 | 12/1994 | |

OTHER PUBLICATIONS

"VTech Slide 'N Learn Storybook," VTech, http://web.archive.org/web/20090606153347/http://www.amazon.com/VTech-Slide-n-Learn-Storybook/dp/B0027CS7AE, Jun. 6, 2009.*
"VTech Slide 'N Learn Storybook, Customer Video (Customer Review Entry from Jul. 12, 2011)," J. Simmons, http://www.amazon.com/VTech-Slide-N-Learn-Storybook/dp/B0027CS7AE.*

(Continued)

*Primary Examiner* — Robert J Utama
*Assistant Examiner* — Jennifer L Fassett
(74) *Attorney, Agent, or Firm* — Perkins Coie LLP

(57) ABSTRACT

A book assembly with a track, a slider, and a switch. The slider is visible and can be slid along the track by a user such as a child. The switch is activated by moving the slider in the track. Activating the switch plays a sound or lights a light.

20 Claims, 4 Drawing Sheets

(56) References Cited

OTHER PUBLICATIONS

"Slide N Learn Nursery Book Manual," https://www.vtechkids.com/assets/data/products/%7BFDA15EBF-1499-4AC6-B211-5853F89557FF%7D/manuals/WTP_Slide_n_discover_Book.pdf, 2005.*

European Search Report; EP Application No. 13191033; Applicant: Leo Paper Bags Manufacturing (1982) Limited; Date of Mailing: Mar. 7, 2014; 8 pages.

* cited by examiner

BOOK ASSEMBLY WITH SLIDER-ACTIVATED SWITCH

TECHNICAL FIELD

Embodiments of the present invention are directed to interactive book assemblies.

BACKGROUND

Children's books are often designed to induce children to read, as well as to keep a child's interest throughout the book. For example, children's books come in a variety of shapes, sizes, and styles, and have been designed with, among other things, decorative and colorful covers, bright illustrations, scratch and sniff areas, pop-up figures, and lift-up flaps. Many of these features in the books are designed to make the books more appealing to youthful readers and to teach children new skills, such as dexterity, memory, or imagination and reasoning.

Developing children continuously learn new cognitive and physical skills. Books have been recognized as helping children with letter and word recognition, as well as improving their small motor skills. The more interactive the user is with a book, both on a cognitive level and with being able to physically manipulate portions of the book, the greater opportunity there is for the user to learn on a variety of levels.

DETAILED DESCRIPTION

Figure 1:
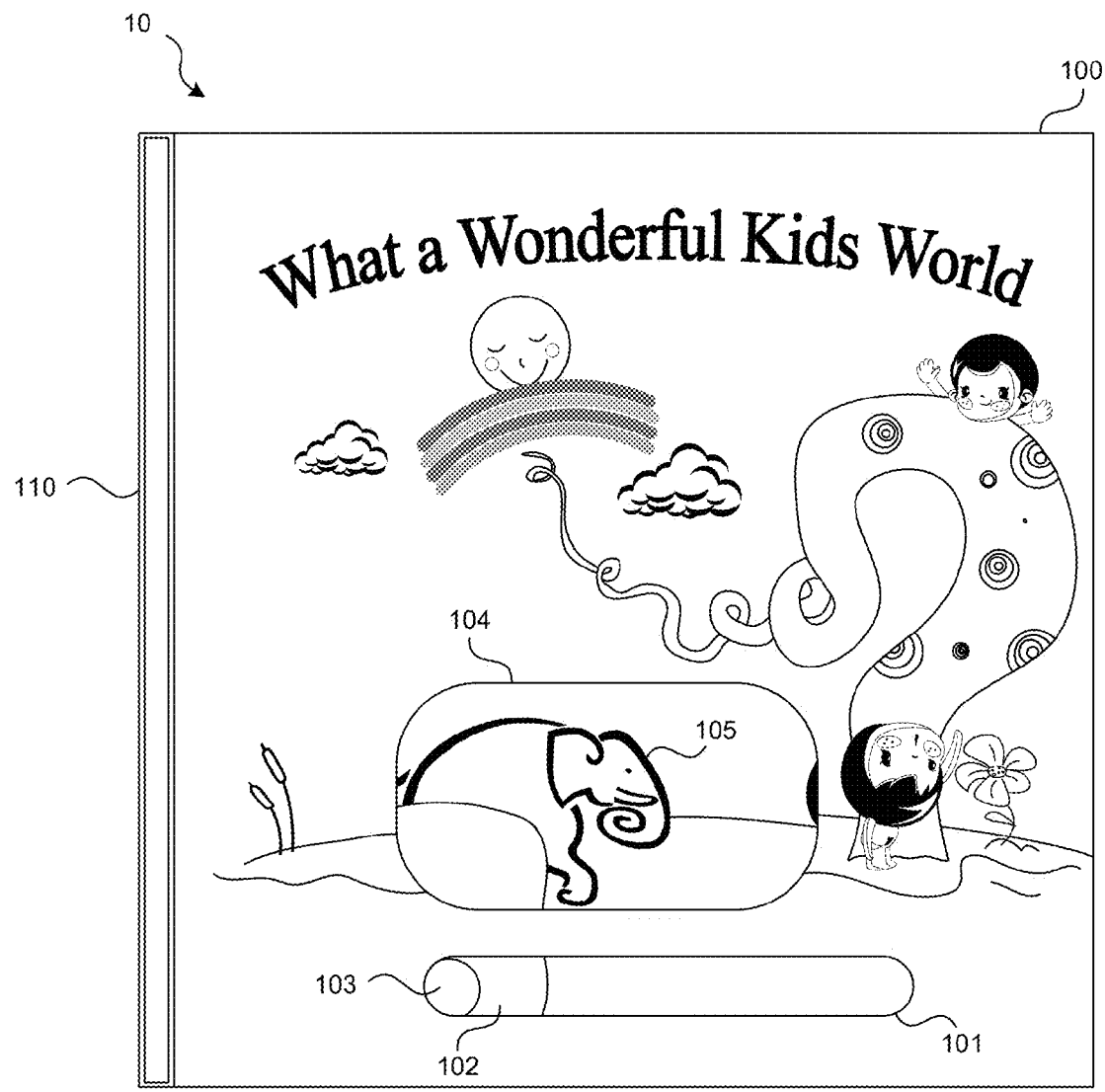
FIG. 1 is a front plan view illustrating a book assembly with a slider and slider-activatable switch in accordance with an embodiment of the present disclosure.

Technology is disclosed for providing a new approach to books by incorporating a track, a slider, and a switch ("the technology") that overcomes drawbacks of the prior art and provides other benefits. The technology enables a reader to have increased interaction with books. In the cover or one or more pages of a book embodying the technology is a track or slot. Movable in the track is a translatable slider, parts of which may be visible outside the slot. A switch and a mechanism to close the switch when the slider is moved in the track provide feedback, e.g., in the form of a sound effect that is played when the slider is moved to one end of the track.

In some embodiments, the book is a bound assembly that includes a front cover and a back cover, with the front cover movable relative to the back cover. A plurality of pages, in some embodiments, is bound together with a binding positioning them between the front and back covers. One or more of the front cover, the back cover, or one of any pages between them has the slider and the track that defines a travel path for the slider (the surface of any cover or page that has such a track is hereinafter referred to as a "page").

A user, such as a child, can manipulate the slider in the track and move it along the track, e.g., from one end of the track to another. A portion of the slider may extend out of the track over the surface of the page, and may extend beyond the track relative to part of the page to be revealed in a separate window. The slider may be given a representative shape and picture, e.g., to illustrate a feature or participant in the book's story. The shape of the window may also help illustrate the story. Along the track, the slider may pass over or under portions of the page representing other elements of the story. By enabling the user to move the feature or participant represented by the slider, and by potentially obscuring and revealing the slider as it is moved along the track, or using the slider to obscure and reveal other features, the technology can help the user read, participate in, and understand the story.

Along the track for the slider is disposed at least one switch that is activated when the slider is moved along the track and reaches the switch. For example, a membrane switch located at one end of a track can be used to generate an appropriate sound when the slider, representing an actor in a story, is moved to that end of the track, thereby activating the switch. Additional switches can be provided along the track that, upon activation, cause the book to play other or different sounds along the way. In some embodiments, one or more of the switches activated by the slider trigger one or more lights and/or a tactile feedback instead of or in addition to playing sounds. The feedback provided by the user's manipulation of the slider provides additional opportunities for the user to learn and participate in the reading of the book as well as to practice his or her coordination and physical dexterity skills. In young users who are not yet able to decipher the written word, the tactile manipulation of the slider and sound generation through the story also serves to retain their interest and promote cognitive cause-and-effect thinking skills.

In various embodiments of the technology, various numbers and arrangements of tracks and sliders are possible. For example, in some embodiments:

- only one page (e.g., a front outside cover or a back inside cover) has a slide and track;
- one slide and track is used for several pages (e.g., with a sensor to determine the current page so that when a switch is triggered, different sounds play for different pages);
- one slide and track is used with a separate switch (or set of switches) for each page;
- a single slide moves along a different track for each page;
- multiple pages have their own slides and tracks (including their own switches);
- a page has different sliders on opposite sides of the page;
- a page has one track and slider that can be manipulated on either side of the page;
- a two-page spread shares a track so that a slider can cross from one page to another (e.g., when the pages are open flat); or
- one track contains more than one slider (e.g., two sliders that play a sound when brought together, or when both are slid together to one end of the track); sliders may be in different planes so that one is able to pass over another.

Turning now to the figures, FIG. 1 is a front plan view illustrating a children's book assembly 10 with a page 100 in accordance with an embodiment of the technology. Within the page 100 are a track 101 and a window 104, behind which an image, such as an elephant 105, is depicted. Part of a slider 102 is visible in the track 101, and an additional portion of the slider 102 is revealed in the window 104. The slider 102 is partly obscured by the boundary of the window 104, and in turn the slider 102 partly covers the elephant 105 or other image. The portion of the slider 102 visible within the track 101 contains a hole 103 for a finger or tool to grab and slide the slider 102 along the track 101. In some embodiments, instead of a hole 103 the slider 102 has an easy-to-grab post or handle that the user can manipulate to move the slider 102 in the track 101.

In this illustration, the page 100 is a front cover of the book 10. The front cover, back cover, and a plurality of pages are bound together along one edge with a binding 110. The binding 110 may be accomplished by a variety of devices, including, but not limited to, adhesive, staples, clips, rings, or plastic clasps. In the illustrated embodiment of FIG. 1, the cover 100 and pages behind it are substantially square and are all bound along the same edge. In alternate embodiments, pages are configured in different shapes, such as other geometric shapes, or shapes configured to resemble selected items or characters. Each page of the book may be identical to its adjacent pages or may have a unique shape. Adding shape to a page to, for example, form the outline of an animal or toy, reinforces the theme of the book, and provides additional visual stimulation to the user. In addition, it is understood that not all pages need to be bound in the same way or along the same edge as illustrated. Pages that are bound differently, e.g., to fold out in different ways, provide interest to the reader and allow exploration of spatial learning opportunities as well as the ability to expand a story, along with a book, in more than one direction.

In the illustrated embodiment, the track 101 is straight and is disposed from left to right across the page 100 of the book 10. In alternate embodiments, tracks can be arranged in myriad different directions and shapes including, e.g., curved paths, closed geometric figures (a quatrefoil, for example), and paths with forks and multiple endpoints. It is recognized that many different configurations for the tracks exist, and the Figures illustrate but one. Accordingly, a more complex (even maze-like) track configuration can be provided to make the process of moving the slider 102 to a destination in the track 101 more challenging or require greater cognitive or motor skills from the user.

In some embodiments, the user is prompted to move the slider 102 along the track 101 on one or more pages by a prompting portion for the reader, i.e., a question, to which the answer is revealed when the slider 102 is moved. The track 101 may allow the user to move the slider 102 in more than one direction in order to try different responses (e.g., a "yes" option and a "no" option at either end of a straight track 101 or a U- or V- or T- or M-shaped track 101).

Where the slider 102 is used to tell a portion of a story, one end of the track 101 may be a starting or "home" position from which that portion of the story begins. Where the slider 102 can be moved in more than one direction (e.g., to give one of two answers to a question), a home position may be, e.g., in the middle of the track 101. In some embodiments, the slider 102 may be spring-loaded or otherwise induced to return to a home position (e.g., using a rubber band, a resetting lever, or gravity).

Figure 2:
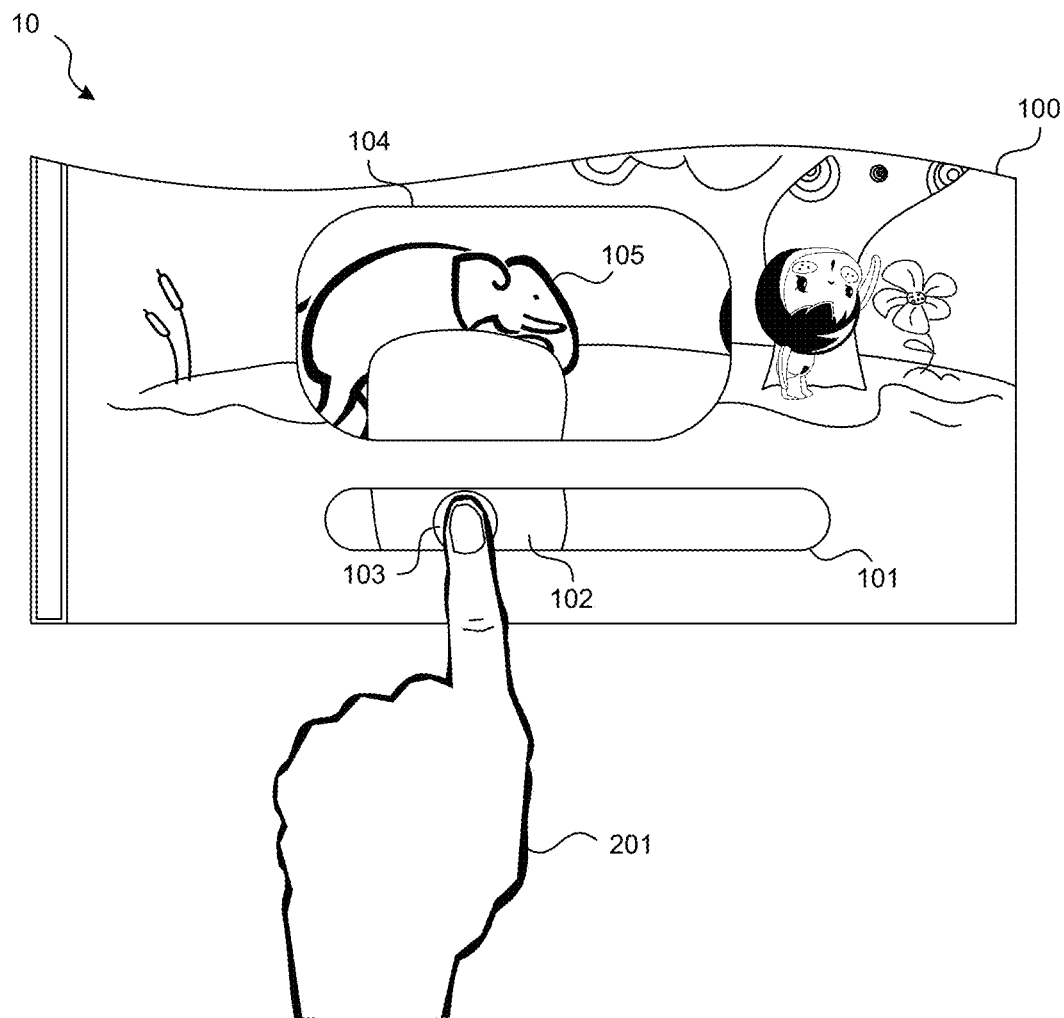
FIG. 2 is a front plan view illustrating partial translation of the slider in a page of the book assembly of FIG. 1.

FIG. 2 is a front plan view illustrating partial translation of the slider 102 in the page 100 of the book assembly 10 of FIG. 1. The full width of the slider 102 is visible in the window 104, and it covers a different and larger portion of the elephant 105. In the illustrated embodiment, the track 101 is a slot wide enough for a finger 201 to reach in to manipulate the slider 102, and the slider 102 contains a hole 103 approximately sized for a fingertip. In some embodiments, the track 101 may be narrower than a finger width and a portion of the slider 102 may project from, or otherwise extend above, the track 101, enabling a user to manipulate the slider 102 directly without having to reach into the track 101. For example, a portion of the slider 102 beneath the surface of the page 100 can be connected to a portion of the slider 102 above the surface of the page 100 by a portion of the slider 102 comprising a post or tab in the narrow part of the track 101. In various embodiments, the slider 102 is designed to be operated by an engagement portion such as a cavity for a finger 201 or a tool (e.g., a stylus), a lever, a pullable tab, a pushable tab, a roller, a wheel, a button, a magnet, an apparatus for blowing, or a mechanism that responds to tilting. Different modes of operating the slider 102—including different shapes of the slider 102 and the means of manipulating it—encourage use and development of different motor skills and coordination abilities.

Figure 3:
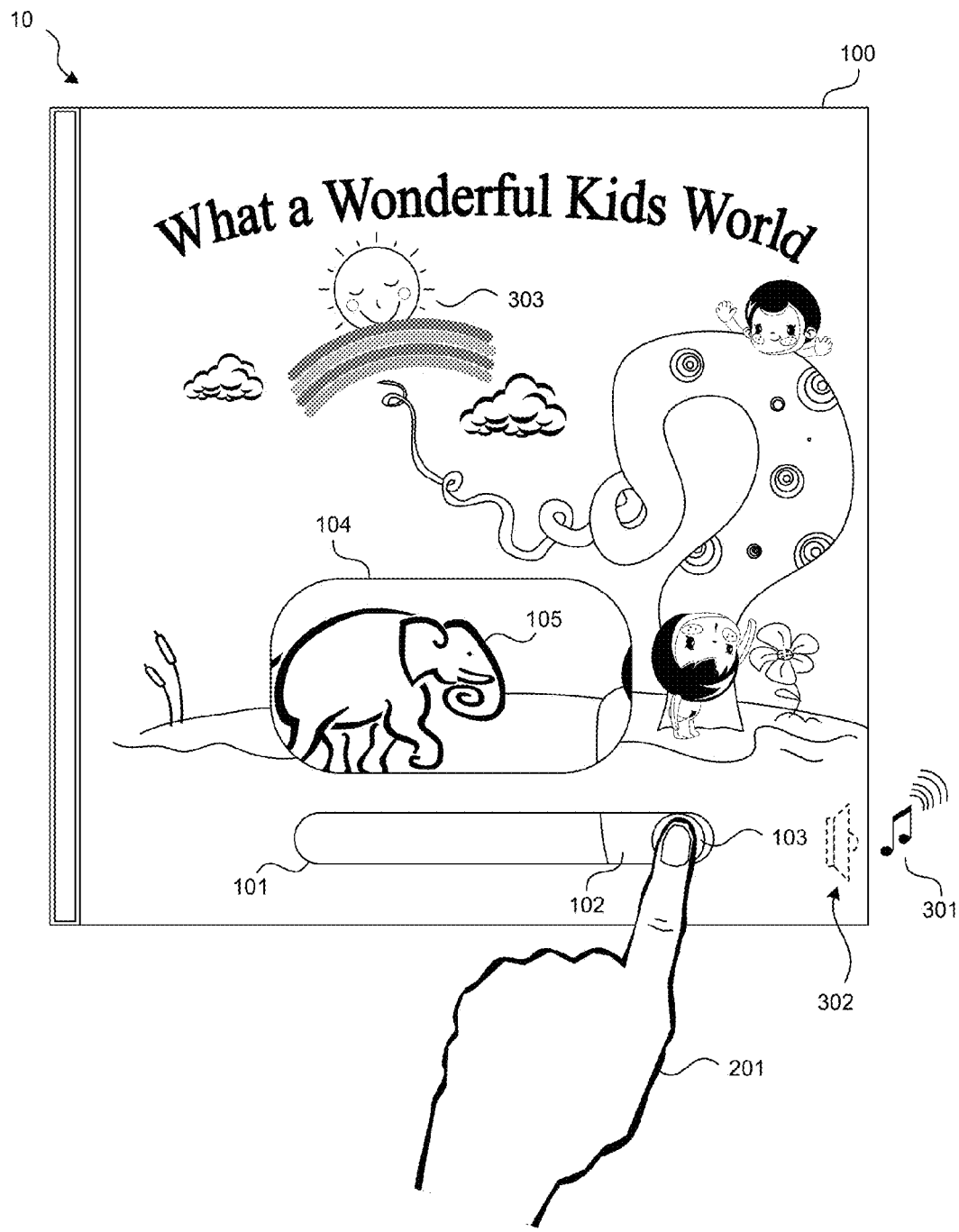
FIG. 3 is a front plan view illustrating full translation of the slider in the page of FIG. 1.

FIG. 3 is a front plan view illustrating full translation of the slider 102 in the page 100 of the book assembly 10 of FIG. 1. The user's finger 201 has slid the slider 102 all the way to the end of the track 101 (where, in this illustration, the hole 103 is at the right end of the track 101 and cannot be used to push the slider 102 any farther). At the end of its travel along the track 101, the slider 102 has almost completely disappeared from the window 104 to become hidden behind the surface of the page 100, revealing all of the elephant 105 or other selected image. In addition, at the end of the track 101 the slider 102 engages and activates a hidden switch, such as a membrane switch, thereby causing an electronic package that has circuitry, an integrated circuit, a speaker 302, and a battery or other power source, to generate a sound 301 to play through the speaker 302. For example, if the slider 102 has an image of a baby elephant and the user has been given a goal of, say, guiding the baby elephant to the base of a rainbow beanstalk, then sliding the slider 102 along the track 101 until it reaches the end of the track 101 could activate the switch, causing the electronic package to generate an encouraging "You made it!" sound and entertaining music 301 to play through the speaker 302. Actuating the switch may also activate, for example, a light-emitting diode that, e.g., causes an image of the sun 303 to shine.

Figure 4:
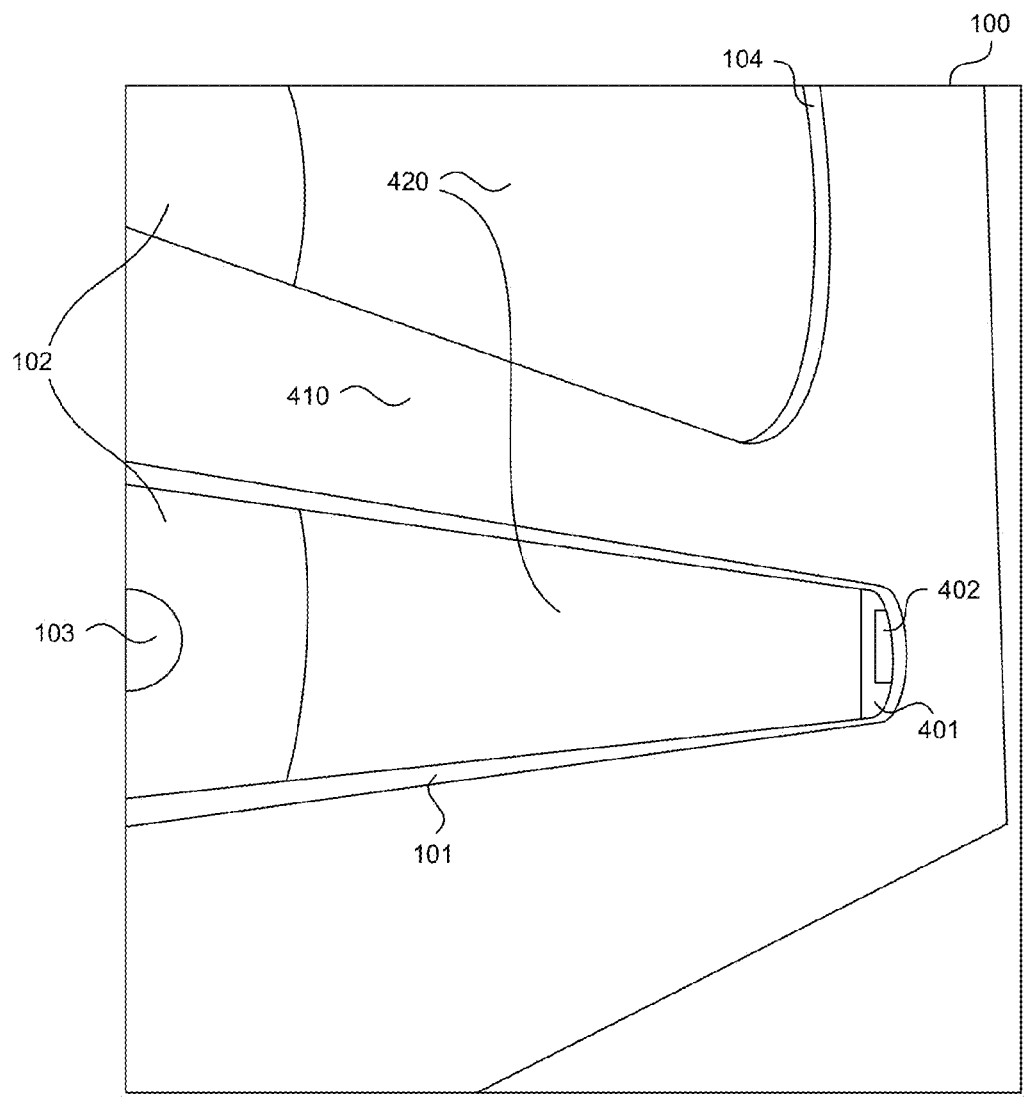
FIG. 4 is an angled perspective view illustrating a switch at one end of a track.

FIG. 4 is an angled perspective view illustrating a switch 402 at one end of the track 101. The perspective view of the illustrated embodiment more clearly shows three layers: an upper layer 410 in which the track 101 and the window 104 are cut out; a lower layer 420 revealed through the track 101 and the window 104; and a middle layer containing the slider 102 and the switch 402. The illustrated embodiment shows a membrane switch 402 triggered by physical contact with the leading edge of the slider 102. The illustrated switch is mounted on an end plane 401 perpendicular to the track 101 so that when the slider 102 is moved to the end of the track 101, the switch 402 is directly engaged by the leading edge of the slider 102, thereby actuating the switch 402. In various embodiments, one or more switches 402 comprise, for example, a Hall effect sensor that does not require physical contact, a reed switch, or metal contacts that form a circuit when a slider with a conductive portion passes over or between them. In some embodiments, a switch 402 is mounted in parallel with the track 101, within the track 101, or adjacent to the track 101 such that the slider 102 activates the switch 402 when it is moved down the track 101.

While the illustrated embodiment of the technology is a reading book, other embodiments of the book assembly include notebooks, date books, calendars, diaries, address books, coloring books, spiral- or comb-bound book assemblies, booklets, magazines, journals, notepads, greeting cards, etc.

Although embodiments of the technology have been described herein for purposed of illustration, various modifications may be made without deviating from the spirit and scope of the technology. It is to be understood that the subject matter defined in the appended claims is not necessarily limited to the specific features described above. Rather, the specific features described above are disclosed as example forms of implementing the claims. Accordingly, the technology is not limited except as by the appended claims.

I claim:

1. A book assembly, comprising:
    a plurality of pages;
    for each page in the plurality of pages:
        a track within the page, wherein the track has an end;
        a slider carried by the page, translatable along the track by tactile manipulation of the slider,
            wherein the slider has a leading edge positioned within the track, such that upon translation of the slider along the track to the end of the track, the leading edge of the slider reaches the end of the track; and
        a membrane switch positioned at the end of the track,
            wherein the membrane switch is positioned to be actuated by the leading edge of the slider upon translation of the slider along the track to the end of the track;
    such that pages in the plurality of pages have separate tracks and switches.

2. The book assembly of claim 1 wherein a page in the plurality of pages is a cover of the book assembly.

3. The book assembly of claim 1, further comprising a front cover and a back cover.

4. The book assembly of claim 1 wherein in at least one page, the track has more than two endpoints.

5. The book assembly of claim 1, further comprising, in at least one page, means for returning the slider to a home position.

6. The book assembly of claim 1 wherein the slider is continuously translatable along the track or is translatable among more than two positions along the track.

7. The book assembly of claim 1 wherein in at least one page, the track is wide enough to accommodate a finger to manipulate the slider therein.

8. The book assembly of claim 7 wherein the slider contains a finger receiving recess or aperture configured to receive a user's fingertip therein,
    such that the finger receiving recess or aperture of the slider is substantially aligned with the track, and the slider is translatable along the track by a finger engaging the finger receiving recess or aperture.

9. The book assembly of claim 1, further comprising a window in at least one page.

10. The book assembly of claim 9 wherein a portion of the slider is visible in the window in at least one position of the slider along the track.

11. The book assembly of claim 9 wherein a background is visible in the window such that the slider, when translated along the track, passes in front of a portion of the background.

12. A book, comprising:
    at least one page having a lower layer, an upper layer, and a middle layer between the lower layer and the upper layer;
    a slot in the upper layer defining a travel path having an end;
    a slider movable in the middle layer via the slot,
        wherein the slider has a leading edge, such that upon translation of the slider along the track to the end of the track, the leading edge of the slider reaches the end of the track; and
        wherein the slider has an engagement portion for engaging and moving the slider relative to the slot;
    a membrane switch positioned in the middle layer on a plane substantially perpendicular to the travel path of the slider,
        such that the membrane switch is triggered by the leading edge of the slider engaging the membrane switch at the end of the travel path; and
    a user feedback component activated by the membrane switch.

13. The book of claim 12 wherein all of the slider, including the engagement portion, is between the upper layer and the lower layer.

14. The book of claim 12 wherein at least a portion of the slider extends above the upper layer.

15. The book of claim 12 wherein the engagement portion of the slider is a recess or aperture in the slider, such that the slider is fully contained between the upper and lower layers and does not extend above the upper layer.

16. The book of claim 12, further comprising a window in the upper layer.

17. The book of claim 12 wherein the user feedback component comprises an audio speaker.

18. The book of claim 12 wherein the user feedback component comprises a light-emitting diode.

19. The book of claim 12, further comprising a channel in the middle layer substantially aligned with the slot, such that the slider is movable within the channel.

20. The book of claim 19 wherein a narrowest dimension of the channel is wider than a narrowest dimension of the slot.

* * * * *